May 30, 1944.                C. S. ASH                2,349,928
                     WHEEL AND BRAKE ASSEMBLY
                        Filed Feb. 26, 1941          2 Sheets-Sheet 1

May 30, 1944.                C. S. ASH                2,349,928
WHEEL AND BRAKE ASSEMBLY
Filed Feb. 26, 1941                    2 Sheets-Sheet 2

INVENTOR
Charles S. Ash
BY
Morgan, Finnegan & Durham
ATTORNEYS

Patented May 30, 1944

2,349,928

UNITED STATES PATENT OFFICE 2,349,928

WHEEL AND BRAKE ASSEMBLY

Charles S. Ash, Milford, Mich.

Application February 26, 1941, Serial No. 380,582

3 Claims. (Cl. 188—72)

The present invention relates to new and improved dual tired wheel and brake assemblies particularly adapted for use with automotive road vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements hereinshown and described.

The accompanying drawings, referred to herein and constituting a part hereof, illustrate one embodiment of the invention, and together with the description, serve to explain the principles of the invention.

Figure 1:
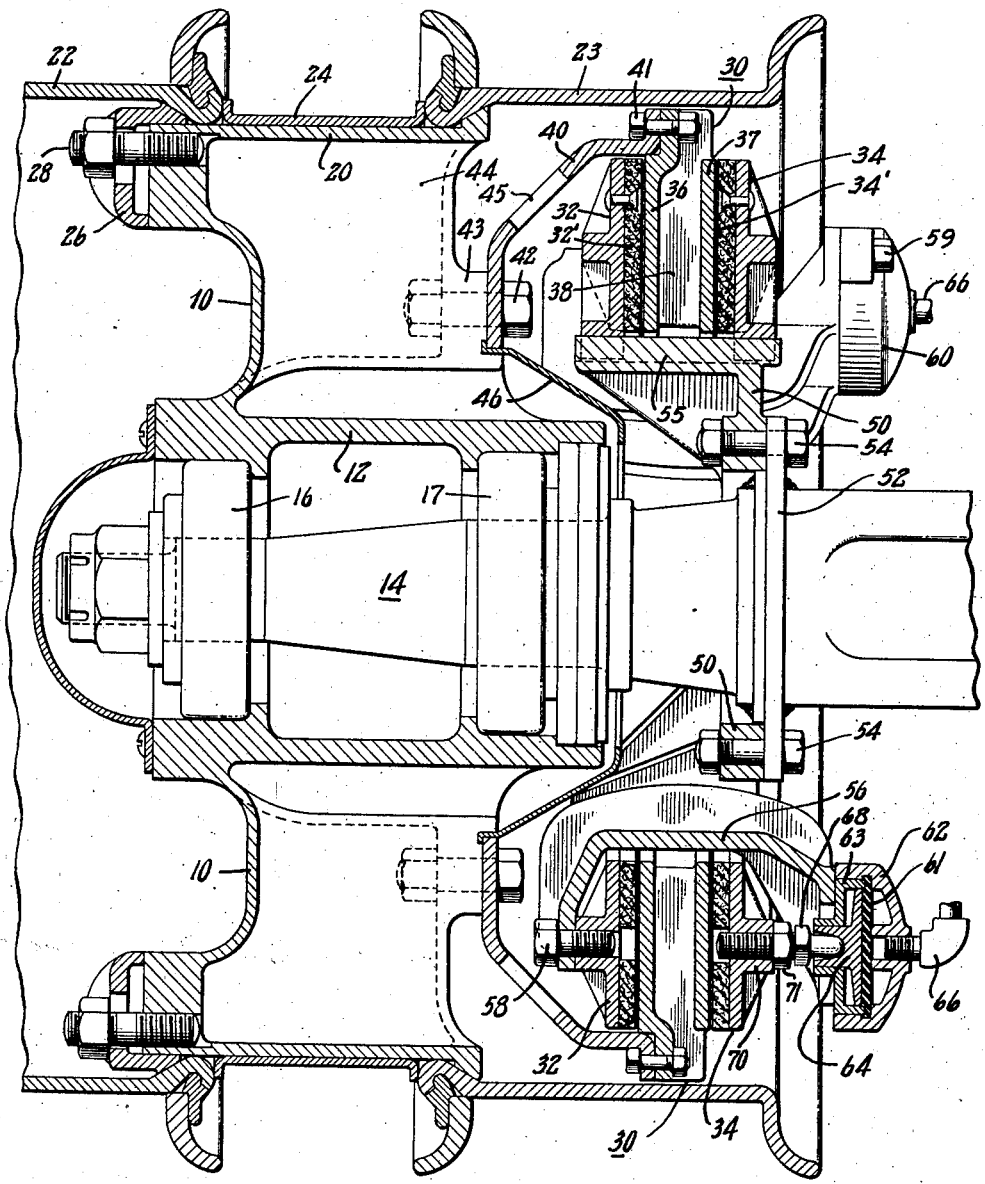
Figure 1 is a fragmentary vertical section of a wheel and brake assembly adapted for use with two tire carrying rims and as applied to a trailing or non-driven axle.
Figure 2:
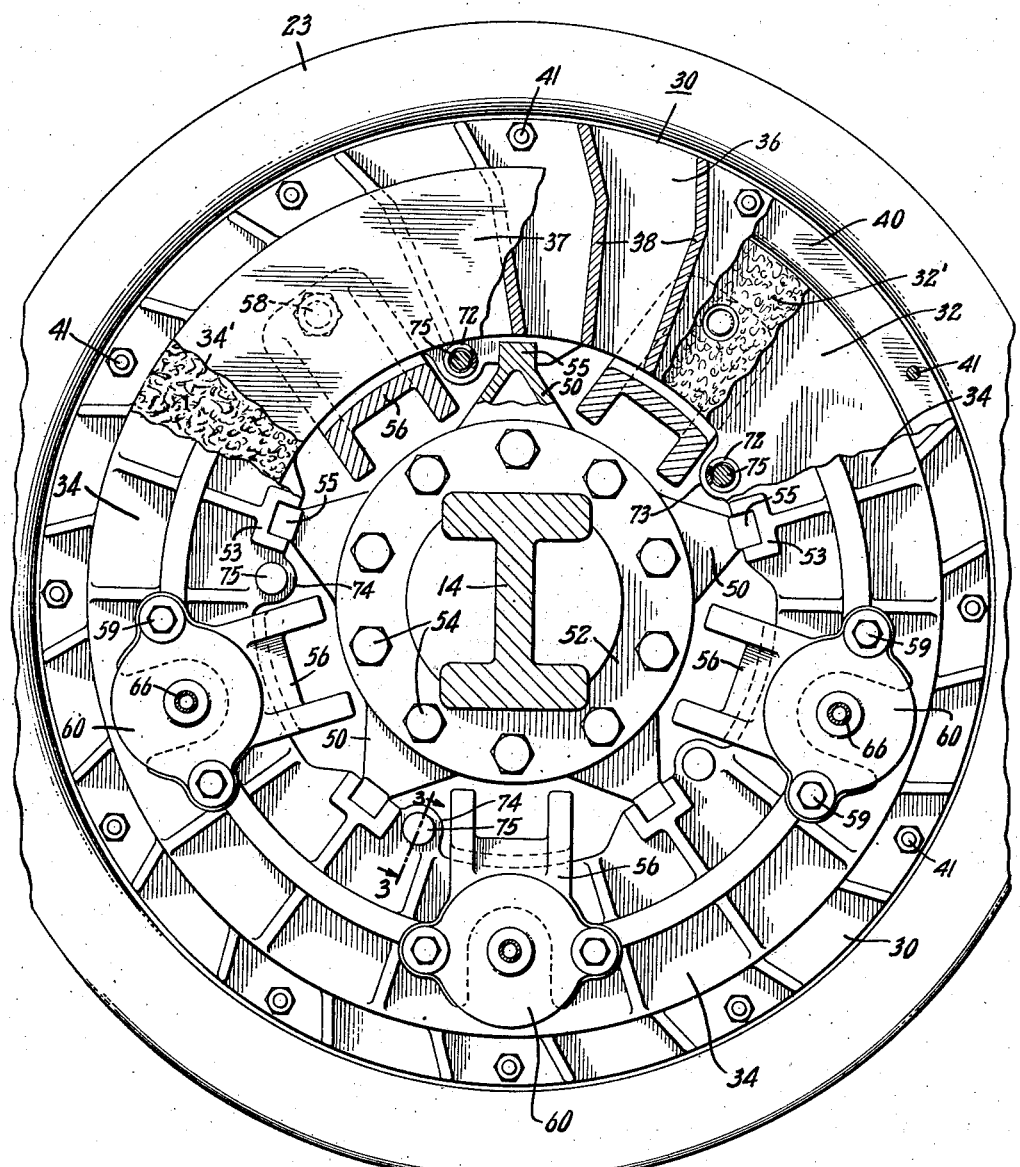
Figure 2 is a view looking from the right of Fig. 1 with certain parts broken away in successive steps to show the details of construction in different planes.
Figure 3:
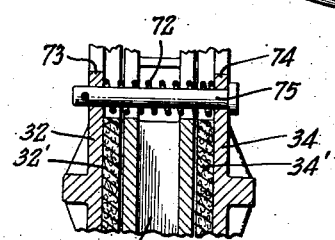
Figure 3 is a fragmentary section taken on line 3—3 of Fig. 2 showing the means for normally holding the braking mechanism in non-braking position.

The invention has for its object the provision of a novel and improved dual tired wheel and brake assembly particularly adapted for use with automotive road vehicles. A further object of the invention provides an improved brake structure for dual tired wheels in which the rotatable brake member is acted upon by a pair of substantially similar but opposed brake shoes which are anchored against rotation by their engagement with a spider bracket secured on the wheel axle. Another object of the invention is the provision of a brake assembly for dual tired wheels in which the brake member, rotating with the wheel, produces a strong flow of air interiorly of the brake member whereby frictional heat generated during braking is dissipated both from the exterior and interior of the brake.

Referring now to the illustrative embodiment of the invention, a braking member is provided to rotate with the dual tired wheel and is formed with interior air passages having considerable surface area and extending in a generally radial direction to act as a blower for circulating a powerful air current interiorly of the braking member and brake mechanism as the wheel rotates. The brake member is positioned between disc-shaped brake shoes which are axially movable towards each other and into contact with opposite faces of the braking member, the brake shoes being held against rotation to provide braking action on the brake member and thereby retard rotation of the wheel. The brake shoes are preferably provided with the usual friction material on the surfaces adjacent the braking member and contact with the metal surfaces of the braking member, thus providing the greatest possible cooling action on those parts most subject to frictional heat. The exterior of the brake shoes are preferably exposed to the atmosphere for cooling and may be ribbed to increase their strength, resist warping and increase heat dissipation.

The brake shoes are anchored against rotation by mounting them on a spider bracket, which is secured to the wheel axle, and providing for axial movement of the brake shoes thereon. The brake shoes are interconnected by a plurality of C-shaped yokes which also carry the brake shoe actuating diaphragms.

It will be understood that the foregoing general description, and the following detailed description as well, are exemplary and explanatory of the invention, but are not restrictive thereof.

Referring now in detail to the drawings, the invention is shown as applied to a dual tired wheel rotatably mounted on a trailing or non-driven axle. The wheel 10 is provided with an integral hub portion 12 which extends inwardly for a considerable distance and is mounted for rotation upon the axle 14 by means of bearings 16, 17. The outer rim 20 of wheel 10 may be cylindrical in form and adapted to have demountably secured thereon a pair of spaced tire mounting rims 22, 23. The tire rims 22, 23 may be held in spaced relation by a spacer sleeve 24 and clamped to the wheel 10 by the usual clamp lugs 26 and bolts 28.

The illustrative braking means shown in the drawings comprises a rotatable brake member 30 which cooperates with and may be frictionally engaged by non-rotatable brake shoes 32, 34. The brake member 30 comprises an integral internally apertured disc-like member formed as a pair of discs 36, 37 concentric with respect to each other and spaced apart by means of integral ribs 38 extending in a generally radial direction. The spaces defined by the discs 36, 37 and ribs 38 are open both towards the center and the exterior of brake member 30 to allow a free flow of a large volume of air between the discs 36, 37.

The ribs 38 may be sufficient in number to provide a strong, non-warping brake member as well as to act as a centrifugal blower for circulating a relatively large volume of air through the passages within the brake member and about the entire brake mechanism when the brake member rotates.

The brake member 30 may have one of its disc portions, such as 36, of somewhat larger diameter than the other so as to provide a means for attaching the brake member to the dish-shaped member 40, as by bolts 41. Member 40, in turn, may be secured to the wheel 10 by bolts 42 at strengthened portions 43 on the spokes 44 of said wheel. As shown, the ribs 38 are coextensive in radial extent with the outer disk 36 so that the outer ends of the air passages are caused to face laterally inward for flow of air over the outer periphery of the inner disk, and the outer ends of the ribs are bent at an angle so as to face forwardly in one (the general) direction of rotation of the wheel, so as to widen the outer ends of the passageways to promote the flow of air therethrough. A plurality of apertures 45 provided in the dish-shaped member 40 serve to facilitate the circulation of the cooling draft generated by the wheel rotation. A dish-shaped baffle 46, welded or otherwise secured to the inner portion of member 40 and extending both inwardly and towards the axle further serves to direct the air currents and protect the brake mechanism from possible contamination by any excess lubricant exuded from the bearings 16, 17.

The cooperating brake shoes 32, 34, provided with friction material 32', 34' on their operative faces, are supported on the axle 14 and anchored against rotation by means of a spider 50 which is attached to a flange portion 52 of the axle 14 by bolts 54. The outer ends of spider 50 are provided with axially extending guides 55 spaced equidistant from the center of the axle and substantially uniformly spaced with respect to each other. The brake shoes 32, 34 are slidably mounted on guides 55 by means of grooved lugs 53 formed on their inner periphery, thus permitting axial movement of the brake shoes but no rotation in respect to the axle 14.

Interspaced between guides 55 of spider 50 are C-shaped yokes 56, the outboard end of each yoke being secured to brake shoe 32 by cap screws 58. The inboard end of each yoke 56 has secured thereon, as by cap screws 59, a fluid actuated diaphragm member 60 which may consist of an expandable diaphragm 61 sealed within a housing 62 by a flange closure member 63. Slidably mounted within the closure member 63 is a plunger disc 64, the face of which is in contact with the diaphragm 61 and adapted to be actuated thereby.

The fluid pressure for expanding the diaphragm 61 may be admitted to the chamber in housing 62 through pipe connections 66 each of which is preferably connected to a common source (not shown) of fluid pressure controlled in the usual manner by a foot or hand brake device.

The movement of each of the plunger discs 64, as pressure is applied to diaphragms 61, is transmitted to the brake shoe 34 through an adjustable stud bolt 68 one end of which is seated in a flared recess in the hub of disc 64 and the opposite end secured in a thread boss 70 on the brake shoe 34 where it may be held in properly adjusted position by check nut 71.

To maintain the brake shoes 32, 34 in non-braking position or return them thereto after the brake pedal pressure has been released, there is provided a plurality of compression springs 72 the ends of which abut on inwardly projecting ears 73 and 74 formed on the inner edge of brake shoes 32, 34 and held in alinement by guide rods 75 which are mounted in apertures in ears 73, 74.

It will thus be seen that as pressure is admitted to the diaphragm members 60, brake shoe 34 will be moved to contact brake member 30 after which the yokes 56 and with them the brake shoe 32 will be moved inboard until the brake shoe 32 in its turn contacts brake member 30. Further applied pressure then causes the brake member 30, if rotating, to be retarded in its rotation by the pin pinching action of the two brake shoes, such retarding being proportionate to the applied pressure in the diaphragm member 60.

When pressure is released in the members 60 the compression springs 72 return the brake shoes 32, 34 to the non-braking position, thereby permitting free rotation of the wheel 10.

The invention in its broader aspects is not limited to the specific mechanisms shown and described but departures may be made therefrom within the scope of the accompanying claims without departing from the principles of the invention and without sacrificing its chief advantages.

What I claim is:

1. In an automotive wheel and brake assembly, the combination of an axle member, a wheel having a hub journaled for rotation about the end of the axle member, a centrally apertured brake member comprising outer and inner brake disks, the outer disk being of greater diameter than the inner disk and having its outer peripheral portion projecting beyond the outer peripheral portion of the latter, said disks being separated by radial partitions coextensive in radial extent with the outer disk and forming air passageways, the outer ends of said partitions being bent at an angle so as to face forwardly in one direction of rotation of the wheel, a pair of spaced apart centrally apertured brake shoes between which the brake member is located, one for engagement with each of the brake disks of the brake member and each of the brake shoes comprising a disk having its face adjacent the coacting brake disk of the brake member provided with friction material, mounting means carried by the axle member and located between the same and the inner peripheries of the brake member and shoes and comprising an annular series of independent guide rails independently secured to the axle and on which the brake shoes are mounted so as to be held from rotation and so as to be axially slidable toward and from the brake disks of the brake member, and a dished member surrounding the inner end of the hub and the outer brake shoe and connected to the wheel and to the outwardly projecting peripheral portion of the outer brake disk of the brake member.

2. In an automotive wheel and brake assembly, the combination of an axle member, a wheel comprising a hub journaled for rotation about the end of the axle member, a rim, and a wheel body connecting the hub and rim, a centrally apertured brake member surrounding the axle adjacent the inner end of the hub and comprising outer and inner brake disks, the former of greater diameter than and projecting at its periphery beyond the periphery of the latter, said disks being separated by radial partitions of radial extent equal to the outer disk and forming air passageways opening outwardly at their inner ends between the axle and brake member and at their outer ends beyond the outer periphery of the inner disk and laterally at the latter named ends toward the inner side of the wheel, a pair of spaced apart centrally apertured brake shoes surrounding the axle and between which the brake member is located, each arranged to engage one of the brake disks and each comprising a disk-like member having its face lying adjacent the brake disk which it engages provided with friction material, guide rails carried by the axle member and positioned between the axle and the brake member and brake shoes and engaged with the inner peripheries of the brake shoes so as to hold said shoes from rotation and support them for sliding movements toward and from the brake disks, said brake member, brake shoes and mounting means being thereby all supported by the axle at the inner side of the wheel, and an annular dished member surrounding the inner end of the hub and the outer brake shoe and connected to the wheel body and to the outwardly projecting peripheral portion of the outer brake disk.

3. In an automotive wheel and brake assembly, the combination of an axle member, a wheel journaled for rotation about the end of the axle member and comprising a hub, a rim and a wheel body connecting the hub and rim, a centrally apertured brake member surrounding the axle adjacent the inner end of the hub and comprising outer and inner brake disks, the former of greater diameter than and projecting at its outer periphery beyond the outer periphery of the latter, said disks being separated by radial partitions of radial extent equal to the outer disk and forming air passageways opening outwardly at their inner ends between the axle and brake member and at their outer ends beyond the outer periphery of the inner disk and laterally at the latter-named ends toward the inner side of the wheel, a pair of spaced apart centrally apertured brake shoes surrounding the axle and between which the brake member is located, each arranged to engage one of the brake disks and each comprising a disk-like member having its face lying adjacent the brake disk which it engages provided with friction material, guide rails carried by the axle member and positioned between the axle and the brake member and brake shoes and engaged with the inner peripheries of the brake shoes so as to hold said shoes from rotation and support them for axial sliding movements toward and from the brake disks, said brake member, brake shoes and guide rails being thereby supported by the axle at the inner side of the wheel, an annular dished member surrounding the inner end of the hub and the outer brake shoe and connected to the wheel body and to the outwardly projecting peripheral portion of the outer brake disk, and an annular dished member surrounding the axle adjacent the inner end of the hub and extending outwardly through and secured with the first-named dished member to the wheel body.

CHARLES S. ASH.